United States Patent
Cope

(10) Patent No.: US 7,924,997 B1
(45) Date of Patent: Apr. 12, 2011

(54) METHOD AND APPARATUS FOR TRANSFERRING SERVICES FOR A FIRST LOCATION TO A DIFFERENT LOCATION IN RESPONSE TO A PREDETERMINED EVENT

(75) Inventor: Warren B. Cope, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 2172 days.

(21) Appl. No.: 10/790,459

(22) Filed: Mar. 1, 2004

(51) Int. Cl.
*H04M 3/42* (2006.01)

(52) U.S. Cl. .............................. 379/211.02; 379/221.13

(58) Field of Classification Search ............. 379/221.01, 379/221.02, 221.03, 213.01, 212.01, 279, 379/221.13
See application file for complete search history.

(56) References Cited

U.S. PATENT DOCUMENTS

| | | | |
|---|---|---|---|
| 6,567,514 B2 * | 5/2003 | Fleischer et al. | 379/221.03 |
| 6,654,451 B1 * | 11/2003 | Ward | 379/114.24 |
| 6,678,528 B2 * | 1/2004 | Clark | 455/461 |
| 6,845,155 B2 * | 1/2005 | Elsey | 379/266.04 |
| 6,959,077 B1 * | 10/2005 | Calhoun et al. | 379/221.03 |
| 7,076,045 B2 * | 7/2006 | Gibson | 379/211.02 |
| 2004/0190704 A1 * | 9/2004 | Crockett et al. | 379/211.02 |

OTHER PUBLICATIONS

Midwest Region:Primer for Local Number Portability, Issue 2,p. 1-31, Jul. 27, 1997, http://ported.com/midlnp.zip.*
("Midwest Region: primer for Local Number Portability," Issue 2, p. 1-31, Jul. 27, 1997).*

* cited by examiner

*Primary Examiner* — Curtis Kuntz
*Assistant Examiner* — Amal Zenati

(57) ABSTRACT

A method and apparatus is disclosed that establishes a disaster recovery plan to recover from the occurrence of a predetermined event. The plan enables the transfer of communications for at least one phone number from one switch to another switch by changing the local number portability database and programming the second switch to terminate the phone numbers from the first switch.

29 Claims, 3 Drawing Sheets

METHOD AND APPARATUS FOR TRANSFERRING SERVICES FOR A FIRST LOCATION TO A DIFFERENT LOCATION IN RESPONSE TO A PREDETERMINED EVENT

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in'particular, to communication network architectures and services.

2. Description of the Prior Art

A telephone company provides its customers with support to set up call centers. Call centers are typically a location that has a number of people supplying support or services over the phone. People at the call center typically have a phone associated with them that can be reached by dialing a phone number directly, or by dialing a toll-free number. The Direct dial phone number is typically a 10-digit number that can be accessed through a local service area using 7 of the 10 digits or through a long distance carrier using all 10 digits. The toll free number is one that is translated at a service control point into a 10-digit telephone number. Once the toll free number has been converted into the 10-digit number, the 10-digit number is routed normally. The communications for each phone number are typically routed through a nearby local switch to the call center. If a disaster strikes, for example a flood, and the local switch is disabled, the call center may be put out of action. The company that operates the call center may have another facility at a different location. The company may wish to redirect the calls to the other facility that were originally directed to the call center that was disabled. Currently, access through the toll free number can be redirected by changing the numbers that are translated from the toll free number. Redirecting the direct dialed numbers is currently a time consuming task. The company that operates the call center can not fully service its customers until both the direct dialed numbers and the toll free access numbers have been redirected.

Therefore there is a need for a system and method for redirecting access for a telephone number.

SUMMARY OF THE INVENTION

A method and apparatus is disclosed that establishes a disaster recovery plan to recover from the occurrence of a predetermined event. The plan enables the transfer of communications for at least one phone number from one switch to another switch by changing the local number portability database and programming the second switch to terminate the phone numbers from the first switch.

DETAILED DESCRIPTION OF THE PREFERRED EMBODIMENT

Figure 1:
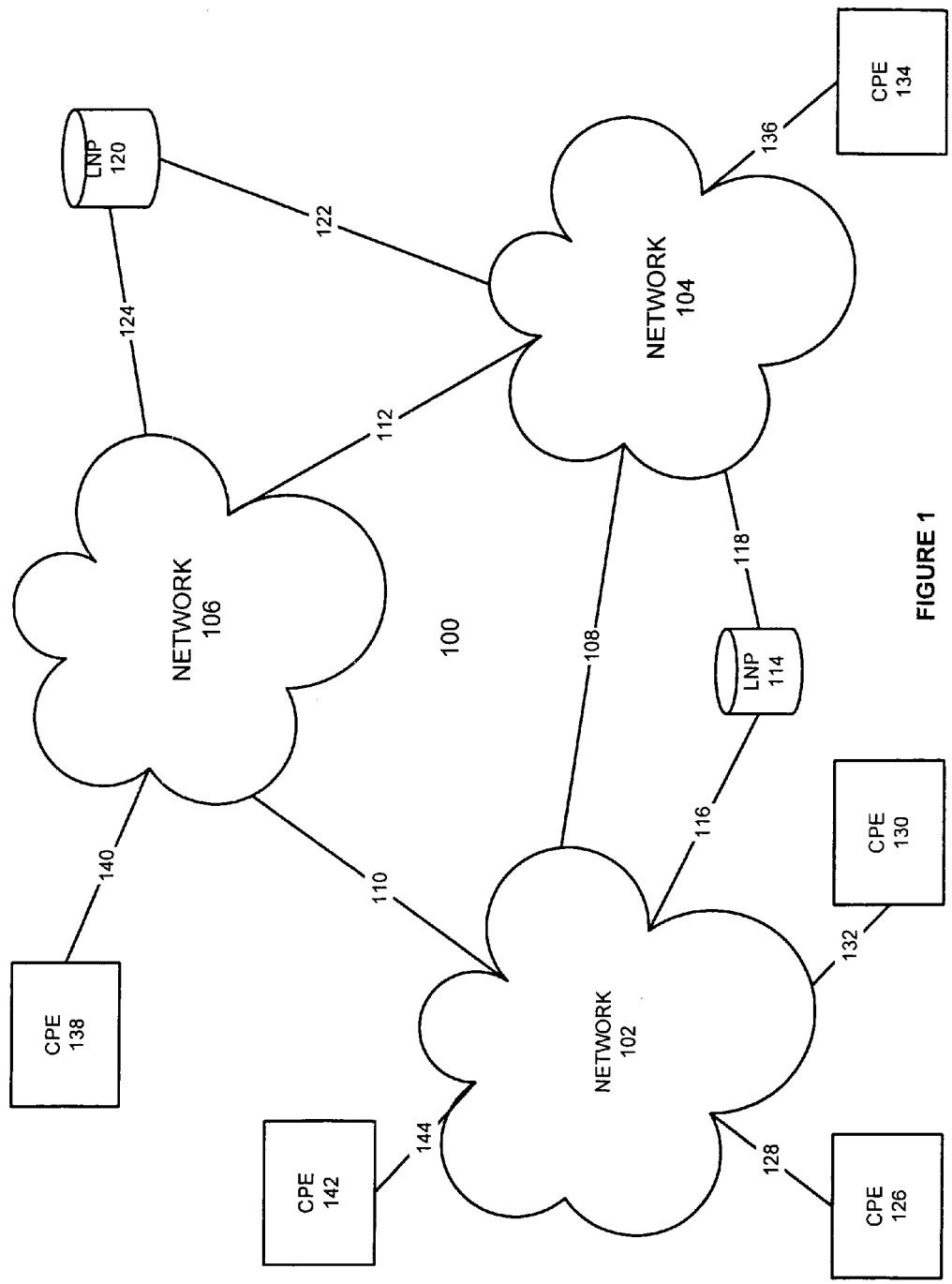
FIG. 1 illustrates a network architecture in an example embodiment of the invention.
Figure 2:
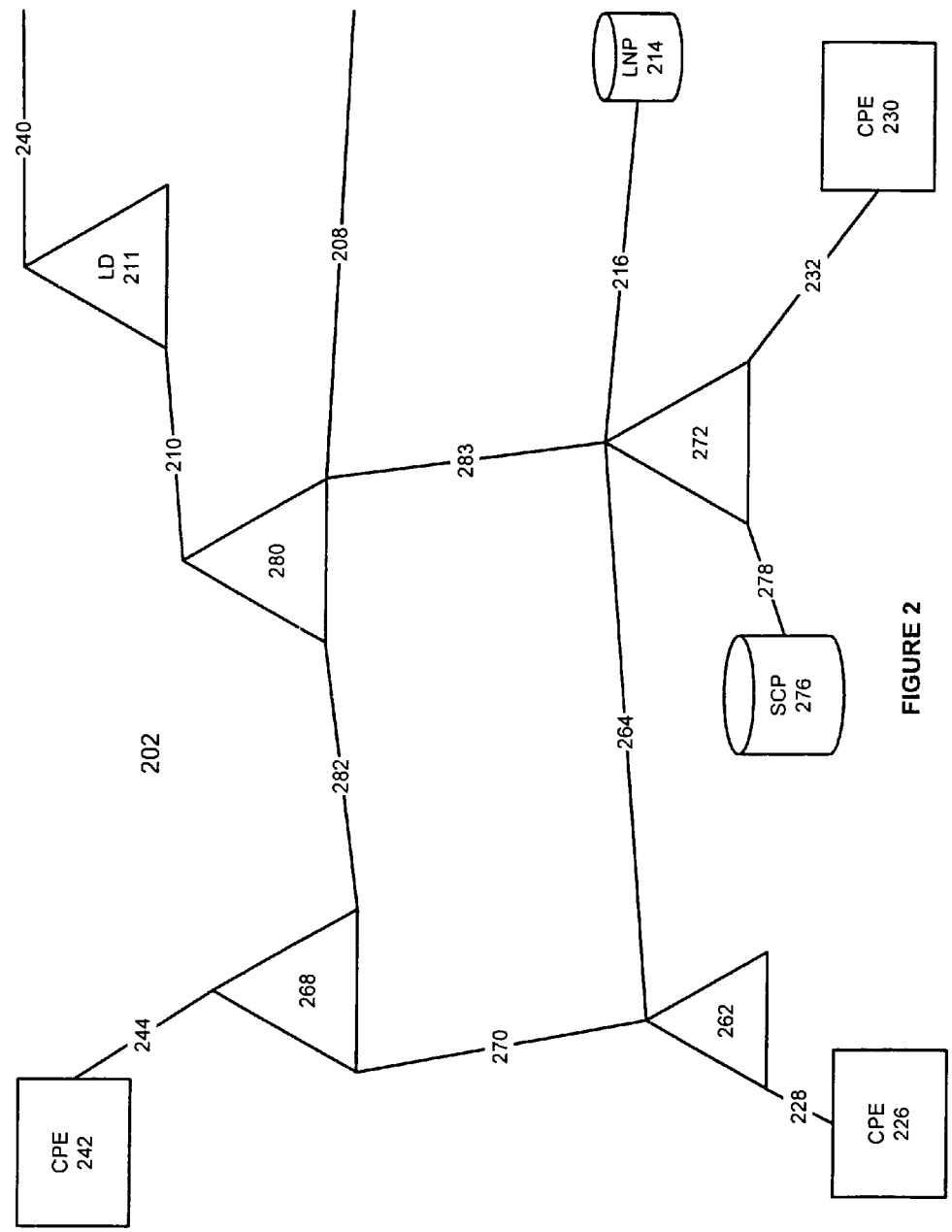
FIG. 2 illustrates a local service area in an example embodiment of the invention
Figure 3:
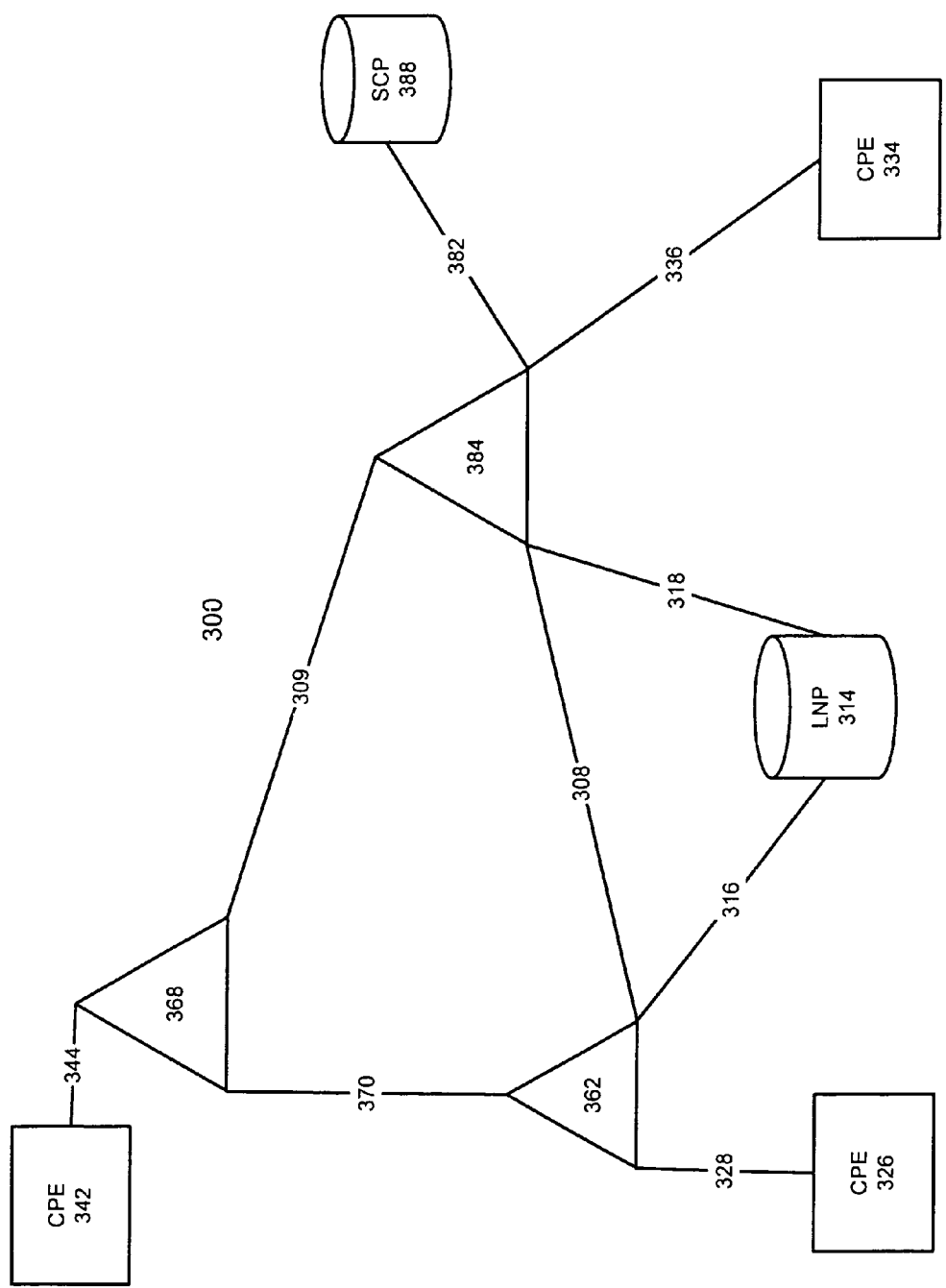
FIG. 3 illustrates a regional service area in an example embodiment of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below for the various examples, can be combined in various ways to form multiple variations of the invention. As a result, the invention is not limited to the specific examples described below, but only by the claims and their equivalents.

Network Architecture—FIG. 1

FIG. 1 illustrates network architecture 100 in an example embodiment of the invention. Network architecture 100 includes network 102, network 104, and network 106 that are interconnected by links 108, 110, and 112. Links 108, 110, and 112 may comprise any manner of wire, cable, fiber, wireless, or other suitable communication technique.

Network architecture 100 also includes: Local number portability database (LNP) 120 and local number portability database 114. Local number portability database 120 is connected to network 106 by link 124 and to network 104 by link 122. Local number portability database 114 is connected to network 102 by link 116 and to network 104 by link 118.

Network architecture 100 also includes: Customer premise equipment (CPE) 138, CPE 142, CPE 126, CPE 130, and CPE 134. CPE 138 is connected to network 106 by link 140. CPE 134 is connected to network 104 by link 136. CPE 126, CPE 130, and CPE 142 are respectively connected to network 102 by links 128, 132, and 144.

Network 102 and network 104 are different local service areas of the same service provider. Local number portability database (LNP) 114 is a copy of the regional LNP database and is maintained and controlled by the service provider that operates networks 102 and 104. Network 106 is operated by a different service provider than the service provider that operates networks 102 and 104. LNP 120 is the regional copy of the LNP database and is maintained and controlled by the regional Number Portability Administration Center (NPACs). Both service providers have access to LNP database 120 through links 122 and 124.

In operation, connections to customer site CPE 126 can be obtained by the other customer sites by using local dialing, on-net long distance, long distance originating from a different service provider, and toll free dialing. CPE 130 can connect to CPE 126 by direct dialing inside the local service area 102 using links 132 and 128. CPE 134 can connect to CPE 126 by on-net long distance by using link 136 to networks 104, link 108 to network 102 and link 128 to CPE 126. CPE 138 can connect to CPE 126 by long distance by using link 140 to network 106, link 110 to network 102, and link 128 to CPE 126. CPE 130, CPE 134 and CPE 138 can also reach CPE 126 by using a toll-free number. When CPE 130 and CPE 134 use a toll-free number, it may be translated to a POTS number inside the local service provider's network. When CPE 138 uses a toll-free number, it may be translated into a POTS number inside a service provider network other than the service provider that supports CPE 126.

Local Service Area—FIG. 2

FIG. 2 illustrates local service area 202 in an example embodiment of the invention. Various features of local service area 202 could be incorporated in network 102 of FIG. 1. Local service area 202 includes switches 262, 268, 280 and 272, customer premise equipment (CPE) 226, 230, and 242, service control point 276, local number portability database 214, and long distance service 211.

Switches 262, 268, 280, and 272 are connected with links 270, 282, 283, and 264 respectively. Links 270, 282, 283, and 264 may comprise any manner of wire, cable, fiber, wireless, or other suitable communication technique. Links 270, 282, 283, and 264 may form a portion of a Metropolitan Area Network (MAN). Switches 262, 268, 280, and 272 may be interconnected with additional links, for example between switch 262 and switch 280, but these additional links have been omitted for clarity.

Switches 262, 268 and 272 are coupled to CPE sites 226, 242, and 230 with respective links 228, 244, and 232. Links 228, 232, and 244 can comprise any manner of wire, cable, fiber, wireless, or other suitable communication technique.

Switch 272 is coupled to service control point (SCP) 276 with link 278. Service control point 276 may be used to translate toll-free numbers dialed from the local service area 202, into a plain old telephone service (POTS) number. Other switches may connect to SCP 276 but only one switch is shown connecting to SCP 276 for clarity.

LNP 214 is coupled to switch 272 by link 216. LNP 214 is a copy of the regional LNP database and is maintained and controlled by the service provider that operates local service area 202. Only one connection is shown to LNP 214 for clarity.

Switch 280 is coupled to other networks (not shown) by link 208. Switch 280 is couple to long distance service 211 by link 210. Long distance service 211 is connected to other networks (not shown) with link 240.

In operation, there may be at least two ways that a customer at CPE 230 can be connected to CPE 226. The first way is using a local number. Because both CPE 230 and CPE 226 are within the same local service area 202, CPE 230 can be connected to CPE 226 by dialing the local 7-digit number serviced at CPE 226. When a customer at CPE 230 dials a 7 digit number serviced at CPE 226, switch 272 detects the number and queries LNP 214 to determine if the dialed number has been ported. In one embodiment switch 272 checks LNP 214 database, to see if the number has been ported, for every number dialed. In another embodiment, switch 272 may not query LNP 214 for every number dialed. For example, switch 272 may only check LNP 214 database for calls that will be terminated on-net. When a call will not be terminated on-net, switch 272 may check a regional local number portability database (not shown), or switch 272 may not check any local number portability database. In another embodiment, switch 272 may only check the local copy of the local number portability database LNP 214 when the number dialed is within a predetermined range of numbers. In another embodiment, switch 272 may only check LNP 214 when the destination switch for the dialed number is a predetermined switch, for example when the destination switch for the number dialed is switch 262. When switch 272 querys LNP 214, LNP 214 will indicated if the dialed number has been ported.

Typically, most numbers have not been ported and therefore the programmed "default case" may be that LPN 214 has "no entry" corresponding to the number dialed. The programmed "default case" response of "no entry" from LNP 214 would indicate that the number had not been ported. By indicating that the number has not been ported, LNP 214 would direct switch 272 to connect to switch 262. In another embodiment, each number would have a corresponding entry in the LPN 214 database indicating the proper terminating switch. In this embodiment, switch 272 would connect to whichever switch was indicated by the LNP 214 database. If the number dialed has not been ported, LNP 214 will indicate that switch 272 should connect to switch 262 for the dialed number. Switch 272 will establish a connection to switch 262 and switch 262 will connect the call to CPE site 226.

The number at CPE 226 may also be serviced by a toll-free number. If so, the customer at CPE 230 may dial the toll-free number. When switch 272 detects a toll-free number dialed at CPE 230, switch 272 will contact service control point (SCP) 276. SCP 276 will translate the toll-free number into a POTS number serviced at CPE 226 and send the POTS number to switch 272. Switch 272 then queries LNP 214 to determine if the POTS number has been ported. Switch 272 may not query LNP 214 for every POTS number, as discussed above. If the number has not been ported, switch 272 will establish a connection to switch 262. Switch 262 will connect the call to CPE site 226. In another embodiment, SCP 276 may be the device that contacts the LNP 214 to determine if the POTS number has been ported. SCP 276 may not query LNP 214 for every POTS number. If the number has not been ported, SCP 276 will direct switch 272 to establish a connection to switch 262. Switch 262 will connect the call to CPE site 226.

CPE 226 may also be reached by a customer call originating from a different (off-net) service provider than the service provider that supports CPE 226. For example, a call coming in to switch 280 from long distance (LD) service provider 211 may originate from a different service provider. When switch 280 receives a signal from LD 211, switch 280 will determine if the call originates from a different service provider. One way to determine if the originating switch is off-net is to examine the originating point code. When the call originates from a different service provider, switch 280 will query LNP 214 to determine if the destination number has been ported. If the number has not been ported, switch 280 will establish a connection to switch 262. Switch 262 will connect the call to CPE site 226. In another embodiment, switch 280 may not check LNP 214 for every call originating from a different service provider, switch 280 may only check LNP 214 for a predefined range of destination numbers originating from a different service provider. In another embodiment, switch 280 may only check LNP 214 after it determines that the destination switch is a predetermined switch. For example, when processing a call from LD 211, switch 280 may check LNP 214 only when the terminating switch for the call is switch 262. If the number has not been ported, switch 280 will establish a connection to switch 262. Switch 262 will connect the call to CPE site 226.

If switch 262 becomes disabled, customers will not be able to contact CPE 226. If the company located at CPE 226 also has a facility at CPE 242, the company may wish to redirect all the calls destined for CPE 226 (local, long distance and toll-free), to CPE 242.

In one example embodiment of the invention, a disaster recovery plan has been established that can redirect the calls normally terminated at the first switch, to a second switch, in response to a predefined event. When the predefined event occurs, a local copy of the local number portability (LNP) database is changed to direct communications for the calls normally terminated by the first switch, to the second switch. The second switch will also be changed to terminate the calls normally terminated by the first switch. In one embodiment the second switch is programmed with the numbers from the first switch after the occurrence of the predefined event. In another example embodiment, the second switch will be preprogrammed with the numbers from the first switch, but the numbers from the first switch will not be activated at the second switch until after the occurrence of the predefined event.

The second switch that the number or numbers are redirected to, may be in the same local service area 202, for example switch 268, or may be in a different local service area (not shown) operated by the same service provider. Once the disaster recovery plan has been activated by changing the local copy of the LNP database and by changing the second switch, all the calls normally directed to the first switch, would be terminated by the second switch.

Because LNP 214 is a local copy of the regional LNP database (not shown) and LNP 214 is maintained and controlled by the local service provider that operates local service area 202, the LNP 214 database can be changed by the local service provider without having to go through the complex and time consuming synchronization required when changing the regional LNP database. If/when switch 262 becomes disabled, LNP 214 will be changed to show that the number or numbers that had been terminated by switch 262 have been ported. The switch that the number or numbers are ported to, may be in the same local service area 202, for example switch 268, or may be in a different local service area (not shown) operated by the same service provider.

Once LNP 214 has been changed and switch 268 has been changed, calls from CPE 230 would be redirected to switch 268. When a customer at CPE 230 dials a local 7-digit number that was normally serviced at CPE 226, switch 272 detects the number and queries LNP 214 to determine if the dialed number has been ported. Switch 272 may not query LNP 214 for every number dialed as discussed above. The LNP database will indicate that the number has been ported and direct switch 272 to connect to switch 268, instead of switch 262. Switch 272 will establish a connection to switch 268. Switch 268 has been changed to handle numbers from switch 262 and will connect the call to CPE 242.

When switch 272 detects a toll-free number dialed at CPE 230, switch 272 will contact service control point (SCP) 276. SCP 276 will translate the toll-free number into a POTS number and send the POTS number to switch 272. Switch 272 then queries LNP 214 to determine if the POTS number has been ported. The LNP database will indicate that the number has been ported and direct switch 272 to connect to switch 268. Switch 272 will establish a connection to switch 268. Switch 268 has been changed to handle numbers from switch 262 and will connect the call to CPE site 242. In another embodiment, SCP 276 may be the device that queries the LNP 214 to determine if the POTS number has been ported. LNP 214 will indicate that the number has been ported. SCP will direct switch 272 to connect to switch 268. Switch 272 will establish a connection to switch 268. Switch 268 has been changed to handle numbers from switch 262 and will connect the call to CPE site 242.

When switch 280 receives a signal from LD 211, switch 280 will determine if the call originates from a different service provider. When the call originates from a different service provider, switch 280 will query LNP 214 to determine if the destination number has been ported. LNP 214 will indicate that the number has been ported and instruct switch 280 to connect to switch 268 for the call. Switch 280 will establish a connection to switch 268. Switch 268 has been changed to handle numbers from switch 262, and will connect the call to CPE site 242. In another embodiment, switch 280 may not check LNP 214 for every call originating from a different service provider, switch 280 may only check LNP 214 for a predefined range of destination numbers originating from a different service provider. In another embodiment, switch 280 may only check LNP 214 after it determines that the destination switch is a predetermined switch. For example, when processing a call from LD 211, switch 280 may check LNP 214 only when the terminating switch for the call is switch 262. Once it has been determined that the destination switch is switch 262, the LNP 214 will be checked to determine if the number has been ported. LNP 214 will indicate that the number has been ported and instruct switch 280 to connect to switch 268 for the call. Switch 280 will establish a connection to switch 268. Switch 268 has been changed to handle numbers from switch 262, and will connect the call to CPE site 242.

Regional Service Area—FIG. 3

FIG. 3 illustrates regional service area 300 in an example embodiment of the invention. Various features of regional service area 300 could be incorporated in network architecture 100 of FIG. 1. Regional service area 300 includes local switches 362 and 368, remote switch 384, customer premise equipment (CPE) 326, 334, and 342, service control point 338, and local number portability database 314. Switches 362, 268 and 384 are connected by links 370, 309, and 308 respectively. Switches 362 and 368 are in the same local service area. Switch 384 is in a different local service area than switches 362 and 368, but is serviced by the same service provider as switches 362 and 368. Link 370 could form a portion of a Metropolitan Area Network (MAN). Links 370, 309, and 308, can comprise any manner of wire, cable, or fiber.

Switches 362, 368 and 384 are coupled to CPE sites 326, 342, and 334 with respective links 328, 344, and 336. Links 328, 344, and 336 can comprise any manner of wire, cable, or fiber. Links 328, 344, and 336 may be one or more individual Time Division Multiplex (TDM) circuits, such as DS1, DS3, OC-N.

Switch 384 is coupled to service control point (SCP) 388 with link 386. Service control point 388 may be used to translate toll-free numbers reaching switch 384, into a plain old telephone service (POTS) number. SCP 388 may also be used to direct long distance numbers received by switch 384, to the proper terminating switch. There may be additional connections to SCP 388 but they are not shown for clarity.

LNP 314 is coupled switch 362 by link 316 and to switch 384 by link 318. LNP 314 is a local copy of the regional LNP database (not shown) and is maintained and controlled by the service provider that operates regional service area 300. There may be additional connections to LNP database 314 but they are not shown for clarity.

In operation, there may be at least two ways that a customer at CPE 334 can be connected to CPE 326. The first way is using a direct dialed 10-digit number. Because CPE 334 and CPE 326 are not within the same local service area, CPE 334 must use a long distance service to reach CPE 326. Because CPE 334 and 326 are both handled by the same regional service provider, the long-distance call may be an on-net call. When a customer at CPE 334 dials a 10-digit number (preceded by a 1), switch 384 detects that it is a long distance number. Switch 384 sends the number to SCP 388. SCP 388 determines the correct routing for the number and queries LNP 314 to determine if the dialed number has been ported. SCP 388 may not query LNP 314 for every dialed number, as discussed above. If the number has not been ported, SCP will inform switch 384 that the proper destination for the call is switch 362. Switch 384 will establish a connection to switch 362. Switch 362 will connect the call to CPE site 326.

The number dialed at CPE 334 may also be a toll-free number. When switch 384 detects a toll-free number dialed at CPE 334, switch 384 will contact service control point (SCP) 388. SCP 388 will translate the toll-free number into a POTS number. SCP 388 then queries LNP 314 to determine if the POTS number has been ported. SCP 388 may not query LNP 314 for every dialed number, as discussed above. If the number has not been ported, CPE 388 will inform switch 384 that the proper terminating switch is switch 362. Switch 384 will establish a connection to switch 362. Switch 362 will connect the call to CPE site 326.

If switch 362 becomes disabled, customers will note be able to contact CPE 326. If the company located at CPE 326 also has a facility at CPE 342, the company may wish to redirect all the calls destined for CPE 326 (on-net long distance and toll-free), to CPE 342.

In one example embodiment of the invention, a disaster recovery plan has been established that can redirect the calls normally terminated at the first switch, to a second switch, in response to a predefined event. When the predefined event occurs, a local copy of the local number portability (LNP) database is changed to direct communications for the calls normally terminated by the first switch, to the second switch. The second switch will also be changed to terminate the calls normally terminated by the first switch. In one embodiment the second switch is programmed with the numbers from the first switch after the occurrence of the predefined event. In another example embodiment, the second switch will be pre-programmed with the numbers from the first switch, but the numbers from the first switch will not be activated at the second switch until after the occurrence of the predefined event.

The second switch that the number or numbers are redirected to, may be in the same local service area, for example switch 368, or may be in a different local service area (not shown) operated by the same service provider. Once the disaster recovery plan has been activated by changing the local copy of the LNP database and by changing the second switch, all the calls normally directed to the first switch (on-net long distance and toll-free), would be terminated by the second switch.

Because LNP 314 is a local copy of the regional LNP database (not shown) and LNP 314 is maintained and controlled by the regional service provider that operates regional service area 300, the LNP 314 database can be changed by the regional service provider without having to go through the complex and time consuming synchronization required when changing the regional LNP database. If/when switch 362 becomes disabled, LNP 314 will be changed to show that the number or numbers that had been terminated by switch 362 have been ported.

Once LNP 314 has been changed and switch 368 has been changed, calls from CPE 334 would be redirected to switch 368. When a customer at CPE 334 dials a 10-digit long distance number that was normally serviced at CPE 326, switch 384 detects that it is a long distance number. Switch 384 sends the number to SCP 388. SCP 388 determines the correct routing for the number and queries LNP 314 to determine if the dialed number has been ported. LNP 314 will respond that the number has been ported and will give SCP 388 the new destination switch location. SCP 388 will direct switch 384 to connect to switch 368. Switch 384 will establish a connection to switch 368. Switch 368 has been changed to handle numbers from switch 362 and will connect the call to CPE 342.

When switch 384 detects a toll-free number dialed at CPE 334, switch 384 will contact service control point (SCP) 388. SCP 388 will translate the toll-free number into a POTS number. SCP 388 then queries LNP 314 to determine if the POTS number has been ported. LPN 314 will indicate that the number has been ported and send the new destination information to SCP 388. SPC 388 will inform switch 384 that the proper terminating switch is switch 368. Switch 384 will establish a connection to switch 368. Switch 368 has been changed to terminate numbers normally handled by switch 362 and will connect the call to CPE site 342.

Because a local copy of the regional LNP database, maintained and controlled by the regional service provider, is used to redirect the calls, the local copy of the LNP database can be changed without having to go through the complex and time consuming synchronization required when changing the regional LNP database. This allows the database to be modified by people authorized by the service provider. In one example embodiment, the modification to the service provider's LNP database may be made by accessing a computer or terminal within the computer system that controls the service provider's network. In another example embodiment, access to the service provider's LNP database may be made by accessing a web page. The web page may allow remote access to the LNP database, allowing changes to be made to the LNP database from any location that has Internet access. Security methods to prevent un-authorized changes using Internet access are well known in the arts. In another example embodiment of the invention, the software controlling the service provider's network may detect the failure of a switch, and automatically re-program the local copy of the LNP database to redirect the calls from the failed switch to a different switch.

The LNP database has redirected the calls from the first switch to a different or second switch. The different or second switch will be changed to terminate numbers from the first switch. The changes made to the second switch can be made using a number of different methods. In one example embodiment, the modification to the second switch may be made by accessing a computer or terminal within the computer system that controls the service provider's network. It may be that the same computer or terminal used to modify the LNP database can be used to modify the second switch. In this example embodiment, the changes to the LNP and to the second switch may be made using the same program in a single step.

In another example embodiment, changes to the second switch may be made by accessing the same web page used to modify the LNP database. The web page may allow remote access to the second switch, allowing changes to be made to the second switch from any location that has Internet access. Security methods to prevent un-authorized changes using Internet access are well known in the arts. In another example embodiment of the invention, the software controlling the service provider's network may detect the failure of a switch, and automatically change the second switch to terminate the calls from the failed switch.

Methods used to make changes to the second switch were discussed above. In those discussions, the changes made to the second switch could include the following types of changes. In one embodiment, the change made to the second switch is that the second switch is re-programmed to terminate the numbers from the first switch. In another example embodiment, the second switch will have been pre-programmed to terminate the numbers from the first switch, but the second switch will not be activated to terminate the numbers from the first switch. The change made to the second switch will be the activation of the pre-programmed numbers such that the second switch will be enabled to terminate the calls for numbers from the first switch.

I claim:

1. A method of operating a communication system comprising: programming a first switch to terminate calls directed to at least one phone number at a first call center, wherein the first switch is communicatively coupled to the first call center; establishing a disaster recovery plan to terminate the at least one phone number at a second switch communicatively coupled to a second call center in response to the occurrence of a predetermined event, wherein the predetermined event is when the first switch becomes disabled; in response to the occurrence of the predetermined event, programming a local copy of a local number portability database to direct communications for the at least one phone number to the second switch, wherein the second switch is located in a different geographic area than the first switch, and wherein all the phone numbers actively terminated by the first switch are ported to the second switch.

2. The method of claim 1 where the second switch is programmed to terminate calls to the at least one phone number.

3. The method of claim 1 where the second switch is programmed to terminate calls to the at least one phone number before the occurrence of the predetermined event and where the second switch is activated to terminate calls to the at least one phone number after the occurrence of the predetermined event.

4. The method of claim 1 where the local copy of the local number portability database directs communications for the at least one phone number to the first switch before the occurrence of the predetermined event.

5. The method of claim 1 where the local copy of the local number portability database is queried whenever an on-net originating switch processes a call that will be terminated by on-net switch.

6. The method of claim 1 where the local copy of the local number portability database is queried when the at least one phone number is within a predetermined range of phone numbers.

7. The method of claim 1 where the local copy of the local number portability database is queried when the request for a connection to an on-net switch comes from an off-net device.

8. The method of claim 1 where the programming of the local number portability database to direct communications for the at least one phone number to the second switch occurs automatically with the determination that the first switch is disabled.

9. The method of claim 1 where the at least one phone number is a phone number resulting from the translation of a toll free phone number.

10. The method of claim 9 where the at least one phone number can also be dialed directly.

11. The method of claim 1 where programming the local number portability database is done from a web page.

12. The method of claim 11 where the second switch is changed to terminate calls to the at least one phone number using the web page.

13. The method of claim 12 where the change made to the second switch is to activate the termination of pre-programmed numbers from the first switch.

14. The method of claim 1 where the communications for the at least one phone number are directed to the second switch by changing the location route number in the local number portability database.

15. The method of claim 1 where the local number portability database is a local copy of the regional local number portability database and the local copy of the local number portability database is under the control of only one service provider.

16. A communication system comprising: a first switch programmed to terminate calls directed to at least one phone number at a first call center, wherein the first switch is communicatively coupled to the first call center; a disaster recovery plan to terminate the at least one phone number at a second switch communicatively coupled to a second call center in response to the occurrence of a predetermined event, wherein the predetermined event is when the first switch becomes disabled; a local copy of a local number portability database configured to direct communications for the at least one phone number to the second switch in response to the occurrence of the predetermined event, wherein the second switch is located in a different geographic area than the first switch, and wherein all the phone numbers actively terminated by the first switch are ported to the second switch.

17. The communication system of claim 16 where the second switch is programmed to terminate calls to the at least one phone number before the occurrence of the predetermined event and where the second switch is activated to terminate calls to the at least one phone number after the occurrence of the predetermined event.

18. The communication system of claim 16 where the local copy of the local number portability database directs communications for the at least one phone number to the first switch before the occurrence of the predetermined event.

19. The communication system of claim 16 where the local copy of the local number portability database is queried whenever an on-net originating switch processes a call that will be terminated by on-net switch.

20. The communication system of claim 16 where the local copy of the local number portability database is queried when the at least one phone number is within a predetermined range of phone numbers.

21. The communication system of claim 16 where the local copy of the local number portability database is queried when the request for a connection to an on-net switch comes from an off-net device.

22. The communication system of claim 16 where the programming of the local number portability database to direct communications for the at least one phone number to the second switch occurs automatically with the determination that the first switch is disabled.

23. The communication system of claim 16 where the at least one phone number is a phone number resulting from the translation of a toll free phone number.

24. The communication system of claim 23 where the at least one phone number can also be dialed directly.

25. The communication system of claim 16 where programming the local number portability database is done from a web page.

26. The communication system of claim 25 where the second switch is changed to terminate calls to the at least one phone number using the web page.

27. The communication system of claim 26 where the change made to the second switch is to activate the termination of pre-programmed numbers from the first switch.

28. The communication system of claim 16 where the communications for the at least one phone number are directed to the second switch by changing the location route number in the local number portability database.

29. The communication system of claim 16 where the local number portability database is a local copy of the regional local number portability database and the local copy of the local number portability database is under the control of only one service provider.

* * * * *